US008798886B2

(12) United States Patent
Nodera et al.

(10) Patent No.: US 8,798,886 B2
(45) Date of Patent: Aug. 5, 2014

(54) VEHICLE ENGINE CONTROLLER

(75) Inventors: Masato Nodera, Kariya (JP); Yoshifumi Murakami, Obu (JP)

(73) Assignee: Denso Corporation, Kariya (JP)

( * ) Notice: Subject to any disclaimer, the term of this patent is extended or adjusted under 35 U.S.C. 154(b) by 101 days.

(21) Appl. No.: 13/117,399

(22) Filed: May 27, 2011

(65) Prior Publication Data

US 2011/0295479 A1 Dec. 1, 2011

(30) Foreign Application Priority Data

May 27, 2010 (JP) ................................ 2010-122147

(51) Int. Cl.

| | |
|---|---|
| ***G06F 7/00*** | (2006.01) |
| ***G06F 17/00*** | (2006.01) |
| ***G06G 7/00*** | (2006.01) |
| ***G06G 7/76*** | (2006.01) |

(52) U.S. Cl.
USPC .................. 701/70; 701/79; 701/80; 477/211

(58) Field of Classification Search
CPC .................... F02D 2011/102; F02D 2200/501; F02D 2200/602; F02D 2200/702; F02D 2250/26; F02D 2250/28
USPC .......... 701/70, 112, 113, 54, 61, 78.8, 87, 93, 701/116, 121; 477/107, 211, 217, 115, 208
See application file for complete search history.

(56) References Cited

U.S. PATENT DOCUMENTS

| | | | | |
|---|---|---|---|---|
| 530,776 A * | 12/1894 | Unuvar et al. | ................ | 187/338 |
| 4,987,872 A | 1/1991 | Geselle et al. | | |
| 5,529,039 A * | 6/1996 | Streib | ........................... | 123/399 |
| 6,350,217 B1 * | 2/2002 | Unterforsthuber | ........... | 477/174 |
| 6,881,174 B2 | 4/2005 | McCall | | |
| 7,066,128 B2 * | 6/2006 | Satake et al. | ............... | 123/179.4 |
| 7,188,546 B2 * | 3/2007 | Olofsson | ....................... | 477/211 |

(Continued)

FOREIGN PATENT DOCUMENTS

| | | |
|---|---|---|
| JP | 07-019077 | 1/1995 |
| JP | 07019077 A * | 1/1995 |
| JP | 2005-207260 | 8/2005 |
| JP | 2005207260 A * | 8/2005 |
| JP | 2005-291030 | 10/2005 |

OTHER PUBLICATIONS

JP07-019077A_English_machine_translation.*
English Translation for JP2005-207260.*
Office Action (2 pages) dated May 16, 2013 issued in corresponding Japanese Application No. 2010-122147 and English translation (3 pages).

*Primary Examiner* — Khoi Tran
*Assistant Examiner* — Rachid Bendidi
(74) *Attorney, Agent, or Firm* — Nixon & Vanderhye, PC

(57) ABSTRACT

If it is determined that a brake pedal is pressed while an accelerator pedal is pressed, accelerator position limit control for bringing an accelerator position for engine control to a limit value corresponding to vehicle speed is performed, thereby securing safety at the time when both of the accelerator pedal and the brake pedal are pressed. If it is determined that the accelerator pedal is pressed after the brake pedal is pressed, the accelerator position limit control is prohibited, thereby responding to driver's intention to accelerate. If it is determined that the pressing of the brake pedal is cancelled during execution of the accelerator position limit control, accelerator position recovery control for returning the accelerator position for the engine control to an actual accelerator position is performed, thereby recovering normal running corresponding to the driver's intention to accelerate.

20 Claims, 5 Drawing Sheets

(56) References Cited

U.S. PATENT DOCUMENTS

| | | | | |
|---|---|---|---|---|
| 7,228,233 | B2 * | 6/2007 | Kimura et al. | 701/301 |
| 7,269,499 | B2 * | 9/2007 | Murakami et al. | 701/112 |
| 7,587,270 | B2 * | 9/2009 | Tabata et al. | 701/112 |
| 2008/0227598 | A1 * | 9/2008 | Sigmund | 477/92 |
| 2009/0043470 | A1 * | 2/2009 | Ahn | 701/70 |

* cited by examiner

VEHICLE ENGINE CONTROLLER

CROSS REFERENCE TO RELATED APPLICATION

This application is based on and incorporates herein by reference Japanese Patent Application No. 2010-122147 filed on May 27, 2010.

BACKGROUND OF THE INVENTION

1. Field of the Invention

The present invention relates to a vehicle engine controller that controls an engine based on an accelerator position sensed with an accelerator sensor.

2. Description of Related Art

There is a vehicle mounted with a recent electronically-controlled engine (internal combustion engine) having an accelerator sensor for sensing a pressed amount of an accelerator pedal (i.e., accelerator position). The vehicle controls a throttle position (or intake air quantity) and the like based on the accelerator position sensed with the accelerator sensor, thereby controlling an output of the engine.

For example, Patent document 1 (JP-A-2005-291930) describes a technology that aims to improve safety of such a vehicle. The technology of Patent document 1 compulsorily brings an engine to an idling state when a pressed amount of a brake pedal is equal to or larger than a predetermined value. The predetermined value is a value corresponding to a state where an accelerator pedal and the brake pedal are pressed intentionally at the same time.

When an accelerator pedal and a brake pedal are operated at the same time, a technology described in Patent document 2 (U.S. Pat. No. 6,881,174) suppresses an engine output if it is determined that braking request is stronger than acceleration request based on operation amounts of the accelerator pedal and the brake pedal.

A technology described in Patent document 3 (JP-A-H2-502558) suppresses an engine output if accelerator operation speed is zero when both of an accelerator pedal and a brake pedal are pressed.

Both of the technologies described in Patent documents 1 and 2 secure the safety by suppressing the engine output when both of the accelerator pedal and the brake pedal are pressed. However, for example, in a case where an accelerator pedal of a vehicle such as a towing vehicle is pressed in a state where a brake pedal is strongly pressed to prevent the vehicle from coming down when the vehicle starts on a slope, there is a possibility that the pressed amount of the brake pedal becomes equal to or larger than the predetermined value and the engine output is suppressed according to the technology of Patent document 1. In the same case, according to the technology of Patent document 2, there is a possibility that it is determined that the braking request is stronger than the acceleration request and the engine output is suppressed. Therefore, there is a possibility that the engine output is suppressed and the vehicle cannot be started although a driver intends to accelerate the vehicle.

The technology of Patent document 3 cannot suppress the engine output unless the accelerator operation speed becomes zero even if both of the accelerator pedal and the brake pedal are pressed. Therefore, there is a possibility that the safety at the time when both of the accelerator pedal and the brake pedal are pressed cannot be secured sufficiently.

SUMMARY OF THE INVENTION

It is an object of the present invention to provide a vehicle engine controller capable of responding to driver's intention to accelerate while securing safety of a vehicle.

According to a first example aspect of the present invention, an engine controller of a vehicle has an accelerator sensor for sensing an operation amount of an accelerator operation section as an accelerator position, a brake sensor for sensing an operation of a brake operation section, and an engine controlling section for controlling an engine based on the accelerator position sensed with the accelerator sensor. The engine controlling section determines an on-operation of the accelerator operation section (e.g., pressing of accelerator pedal) based on an output signal of the accelerator sensor and determines an on-operation of the brake operation section (e.g., pressing of brake pedal) based on an output signal of the brake sensor. If it is determined that the on-operation of the brake operation section is performed during the on-operation of the accelerator operation section (i.e., if it is determined that on-operation of brake operation section is performed at the same time when or after on-operation of accelerator operation section is performed), the engine controlling section performs accelerator position limit control for bringing an accelerator position for engine control to a limit value corresponding to vehicle speed.

With such the construction, if it is determined that the on-operation of the brake operation section is performed during the on-operation of the accelerator operation section, i.e., if it is determined that the on-operation of the brake operation section is performed at the same time when or after the on-operation of the accelerator operation section is performed, accelerator position limit control for bringing the accelerator position for the engine control to the limit value corresponding to the vehicle speed is performed. Accordingly, the engine output can be suppressed according to the vehicle speed. Thus, the safety at the time when the on-operations of both of the accelerator operation section and the brake operation section are performed can be secured. If it is determined that the on-operation of the accelerator operation section is performed after the on-operation of the brake operation section is performed, the accelerator position limit control is not performed. Thus, for example, if the on-operation of the accelerator operation section is performed in the state where the on-operation of the brake operation is performed to prevent the vehicle from coming down when the vehicle is started on a slope, the suppression of the engine output can be avoided and the vehicle can be started. Accordingly, the driver's intention to accelerate can be responded to.

According to a second example aspect of the present invention, the engine controlling section starts the accelerator position limit control at a timing, at which it is determined that the on-operation of the brake operation section is performed during the on-operation of the accelerator operation section. With such the construction, the accelerator position limit control can be started quickly when it is determined that the on-operation of the brake operation section is performed during the on-operation of the accelerator operation section.

According to a third example aspect of the present invention, the engine controlling section starts the accelerator position limit control at a timing when a delay corresponding to vehicle speed elapses after it is determined that the on-operation of the brake operation section is performed during the on-operation of the accelerator operation section. With such the construction, a suitable delay corresponding to the vehicle speed can be set since it is determined that the on-operation of the brake operation section is performed during the on-operation of the accelerator operation section until the accelerator position limit control is started.

According to a fourth example aspect of the present invention, the engine controlling section continues the accelerator position limit control until the accelerator position for the engine control is reduced to the limit value after the accelerator position limit control is started. With such the construction, the accelerator position for the engine control can be surely reduced to the limit value.

According to a fifth example aspect of the present invention, the engine controlling section aborts the accelerator position limit control when it is determined that the on-operation of the brake operation section is cancelled during the execution of the accelerator position limit control. With such the construction, if it is determined that the on-operation of the brake operation section is cancelled during the execution of the accelerator position limit control, it can be determined that there is no need to suppress the engine output, and the accelerator position limit control can be aborted.

According to a sixth example aspect of the present invention, the engine controlling section continues the accelerator position limit control even if the vehicle speed becomes zero during the execution of the accelerator position limit control. With such the construction, even if the vehicle speed becomes zero during the execution of the accelerator position limit control, it can be determined that the suppression of the engine output is necessary, and the accelerator position limit control can be continued. Thus, the safety at the time when the on-operations of both of the accelerator operation section and the brake operation section are performed can be improved further.

According to a seventh example aspect of the present invention, the engine controlling section prohibits the accelerator position limit control if it is determined that the on-operation of the accelerator operation section is performed after the on-operation of the brake operation section is performed. That is, when it is determined that the on-operation of the accelerator operation section is performed after the on-operation of the brake operation section is performed, it is determined that the driver has an intention to accelerate, and the accelerator position limit control is prohibited. With such the construction, for example, if the on-operation of the accelerator operation section is performed in the state where the on-operation of the brake operation is performed to prevent the vehicle from coming down when the vehicle is started on a slope, the execution of the accelerator position limit control can be prohibited.

Even when the driver performs the on-operations of both of the accelerator operation section and the brake operation section substantially at the same time, there is a possibility that a difference occurs in detection timing of the on-operation (i.e., timing when output signal of sensor changes into state where on-operation is detected) between an accelerator system and a brake system due to mechanical backlash, difference in response of the sensors or the like. Therefore, although the driver performs the on-operations of the accelerator operation section and the brake operation section substantially at the same time, there is a possibility that it is erroneously determined that the on-operation of the accelerator operation section is performed after the on-operation of the brake operation section is performed, and the accelerator position limit control is not performed.

According to an eighth example aspect of the present invention, the engine controlling section determines that the on-operation of the brake operation section is performed when a predetermined delay elapses after the output signal of the brake sensor switches to a state where the on-operation of the brake operation section is detected. With such the construction, when the driver performs the on-operations of the accelerator operation section and the brake operation section substantially at the same time, even if a certain difference arises in the detection timing of the on-operation (Le., timing when output signal of sensor switches to state where on-operation is detected) between the accelerator system and the brake system, the erroneous determination that the on-operation of the accelerator operation section is performed after the on-operation of the brake operation section is performed can be precluded. Accordingly, the accelerator position limit control can be surely performed.

When the accelerator position limit control is performed, the accelerator position for the engine control may be switched stepwise to the limit value. However, with such the method, there is a possibility that the engine output changes rapidly, whereby shaky feeling can occur and drivability can deteriorate.

According to a ninth example aspect of the present invention, the engine controlling section reduces the accelerator position for the engine control to the limit value at change speed corresponding to vehicle speed as of start of the accelerator position limit control when the engine controlling section performs the accelerator position limit control. With such the construction, the accelerator position for the engine control can be reduced to the limit value at the suitable change speed. Therefore, the rapid change of the engine output can be avoided and the deterioration of the drivability can be prevented.

According to a tenth example aspect of the present invention, the engine controlling section performs accelerator position recovery control for returning the accelerator position for the engine control to an actual accelerator position sensed with the accelerator position sensor when it is determined that the on-operation of the brake operation section is cancelled during the execution of the accelerator position limit control. With such the construction, if it is determined that the on-operation of the brake operation section is cancelled during the execution of the accelerator position limit control, it is determined that there is no need to suppress the engine output because the driver intentionally cancelled the on-operation (i.e., performed off-operation) of the brake operation section. Thus, the accelerator position recovery control for returning the accelerator position for the engine control to the actual accelerator position can be performed. Thus, a transition to running (i.e., normal running) corresponding to the driver's intention to accelerate can be made.

According to an eleventh example aspect of the present invention, the engine controlling section performs accelerator position recovery control for returning the accelerator position for the engine control to an actual accelerator position sensed with the accelerator sensor when an increase amount of the actual accelerator position per predetermined time is larger than a predetermined value during the execution of the accelerator position limit control. With such the construction, when the increase amount of the actual accelerator position per predetermined time is larger than the predetermined value during the execution of the accelerator position limit control, it is determined that there is no need to suppress the engine output because the driver intentionally increased the accelerator position (i.e. pressed accelerator pedal). Therefore, the accelerator position recovery control for returning the accelerator position for the engine control to the actual accelerator position can be performed, whereby the transition to the running (i.e., normal running) corresponding to the driver's intention to accelerate can be made.

According to a twelfth example aspect of the present invention, the engine controlling section ends the accelerator position recovery control when the accelerator position for the engine control becomes equal to or larger than the actual accelerator position after the start of the accelerator position recovery control. With such the construction, the accelerator position for the engine control can be surely increased to the actual accelerator position.

When the accelerator position recovery control is performed, the accelerator position for the engine control may be switched stepwise to the actual accelerator position. However, with such the method, there is a possibility that the engine output changes rapidly, whereby shaky feeling can occur and drivability can deteriorate.

According to a thirteenth example aspect of the present invention, the engine controlling section increases the accelerator position for the engine control to the actual accelerator position at change speed corresponding to vehicle speed as of the start of the accelerator position recovery control or as of the start of the accelerator position limit control when the engine controlling section performs the accelerator position recovery control. With such the construction, the accelerator position for the engine control can be increased to the actual accelerator position at the suitable change speed. Therefore, the rapid change of the engine output can be avoided, and the deterioration of the drivability can be prevented.

According to a fourteenth example aspect of the present invention, the engine controlling section limits the change speed, at which the accelerator position for the engine control is increased to the actual accelerator position, with a predetermined upper limit value when the engine controlling section performs the accelerator position recovery control. With such the construction, the rapid change of the engine output can be surely prevented.

According to a fifteenth example aspect of the present invention, the brake operation section is a brake operation section of a regular brake device or a parking brake device. That is, the present invention is not limited to the construction that performs the accelerator position limit control or the accelerator position recovery control based on the on-operation or the off-operation of the brake operation section of the regular brake device (brake device for decelerating or stopping vehicle during operation of vehicle). Alternatively, the present invention may be applied to a construction that performs the accelerator position limit control and the accelerator position recovery control based on an on-operation or an off-operation of a brake operation section of a parking brake device (brake device for keeping vehicle stationary while vehicle is parked).

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
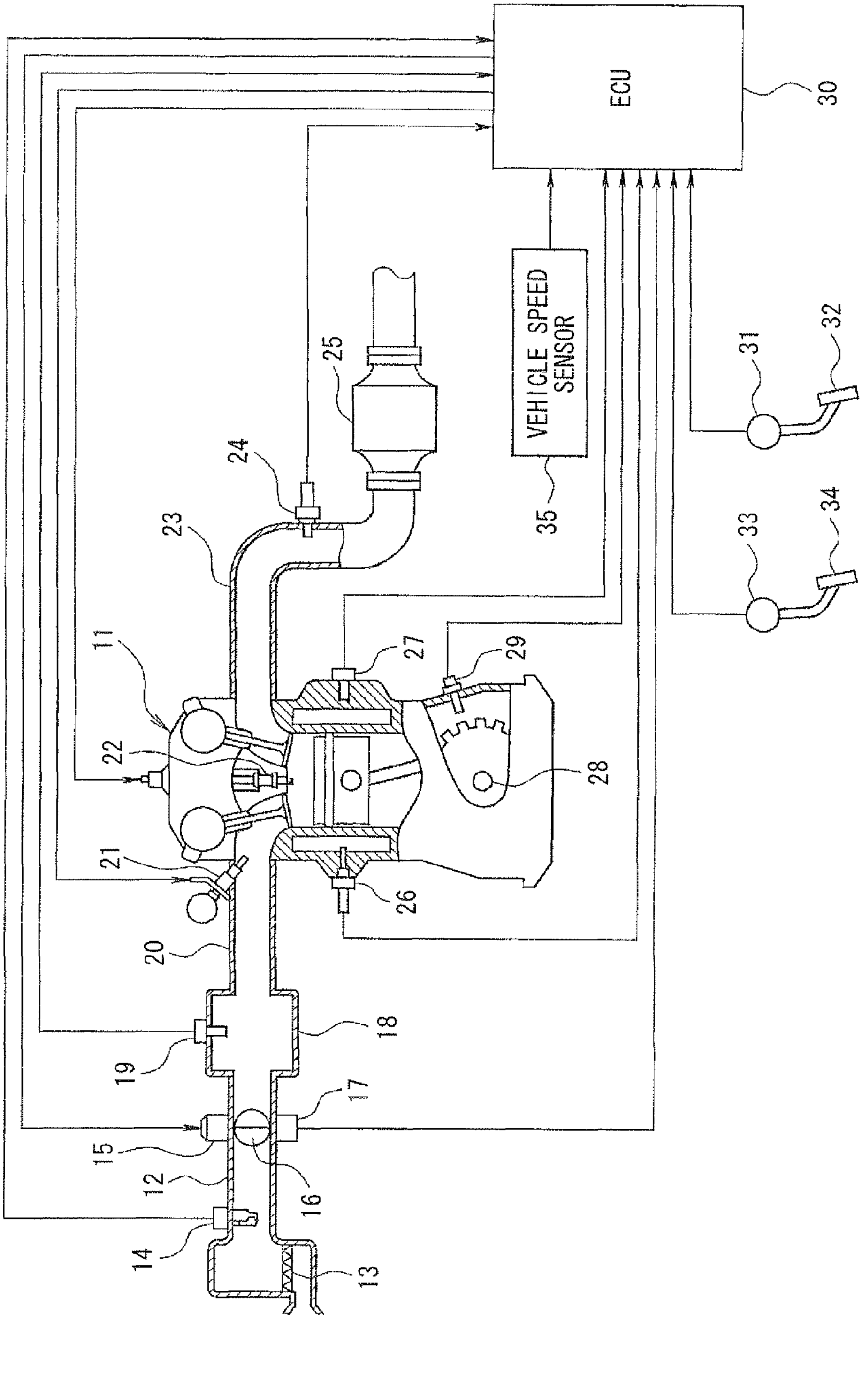
FIG. 1 is a diagram showing a schematic construction of an engine control system according to a first embodiment of the present invention.

Hereafter, embodiments of the present invention will be described with reference to the drawings.

(First Embodiment)

First, a first embodiment of the present invention will be explained with reference to FIGS. 1 to 3. First, a schematic construction of an entire engine control system will be explained with reference to FIG. 1. An air cleaner 13 is provided in the most upstream portion of an intake pipe 12 of an engine 11 (internal combustion engine). An airflow meter 14 for sensing an intake air quantity is provided downstream of the air cleaner 13. A throttle valve 16, whose opening degree is regulated by a motor 15, and a throttle position sensor 17 for sensing an opening degree of the throttle valve 16 (i.e., throttle position) are provided downstream of the airflow meter 14.

A surge tank 18 is provided downstream of the throttle valve 16, and an intake pipe pressure sensor 19 for sensing intake pipe pressure is provided in the surge tank 18. An intake manifold 20 for introducing the air into each cylinder of the engine 11 is provided to the surge tank 18. An injector 21 is attached near an inlet port of the intake manifold 20 of each cylinder. Each injector 21 injects the fuel toward the inlet port. Spark plugs 22 are attached to a cylinder head of the engine 11 for the respective cylinders. A mixture gas in each cylinder is ignited with a spark discharge from each spark plug 22 of the cylinder.

An exhaust gas sensor 24 (such as air-fuel ratio sensor or oxygen sensor) for sensing an air-fuel ratio, a rich/lean state or the like of exhaust gas is provided in an exhaust pipe 23 of the engine 11. A catalyst 25 such as a three-way catalyst for purifying the exhaust gas is provided downstream of the exhaust gas sensor 24.

A coolant temperature sensor 26 for sensing coolant temperature and a knock sensor 27 for sensing knocking are attached to a cylinder block of the engine 11. A crank angle sensor 29 is provided adjacent to an outer periphery of a crankshaft 28 and outputs a pulse signal every time the crankshaft 28 rotates by a predetermined crank angle. A crank angle and engine rotation speed are sensed based on the output signal of the crank angle sensor 29.

An accelerator sensor 31 senses an operation amount of an accelerator pedal 32 (accelerator operation section). A brake switch 33 (brake sensor) senses an operation of a brake pedal 34 (brake operation section). A vehicle speed sensor 35 senses vehicle speed. The brake pedal 34 is a brake operation section of a regular brake device that decelerates or stops a vehicle during an operation of the vehicle. Each of the accelerator pedal 32 and the brake pedal 34 may be a suspended type (pendant type) or a standing type (organ pedal type).

Outputs of the above-mentioned various sensors and switches are inputted to an electronic control circuit 30 (ECU). The ECU 30 is constructed mainly of a microcomputer and functions as an engine controlling section by executing various kinds of engine control programs stored in incorporated ROM (storage medium). The ECU 30 controls a fuel injection quantity, ignition timing, the throttle position (intake air quantity) and the like according to an engine operation state. At that time, the ECU 30 controls an output of the engine 11 by controlling the throttle position (intake air quantity) and the like based on the accelerator position (operation amount of accelerator pedal 32) sensed with the accelerator sensor 31.

The ECU 30 determines the pressing (i.e., on-operation) of the accelerator pedal 32 based on the output signal of the accelerator sensor 31 and determines the pressing (i.e., on-operation) of the brake pedal 34 based on the output signal of the brake switch 33. The ECU 30 performs accelerator position output control for controlling the accelerator position for engine control (i.e., accelerator position used for controlling engine 11) based on the determination results as follows.

If it is determined that the brake pedal 34 is pressed when the accelerator pedal 32 is pressed, i.e., if it is determined that the brake pedal 34 is pressed at the same time when or after the accelerator pedal 34 is pressed, accelerator position limit control for bringing the accelerator position for the engine control to a limit value corresponding to vehicle speed is performed. When it is determined that the accelerator pedal 32 is pressed after the brake pedal 34 is pressed, it is determined that the driver has an intention to accelerate, and the accelerator position limit control is prohibited.

When it is determined that the pressing of the brake pedal 34 is cancelled or an increase amount of an actual accelerator position (accelerator position sensed with accelerator sensor 31) per predetermined time is larger than a predetermined value during the execution of the accelerator position limit control, accelerator position recovery control for returning the accelerator position for the engine control to the actual accelerator position is performed.

Next, details of the accelerator position output control (accelerator position limit control and accelerator position recovery control) will be explained with the reference to FIGS. 2 and 3. In the present embodiment, it is determined that the brake pedal 34 is pressed at a timing when a predetermined delay elapses after the output signal of the brake switch 33 switches to a state where the pressing of the brake pedal 34 is detected. In following explanation, an on-state of a brake (i.e., brake: ON) means a state where it is determined that the brake pedal 34 is pressed based on the output signal of the brake switch 33. An off-state of the brake (i.e., brake: OFF) means a state where it is determined that the pressing of the brake pedal 34 is cancelled based on the output signal of the brake switch 33.

Figure 2:
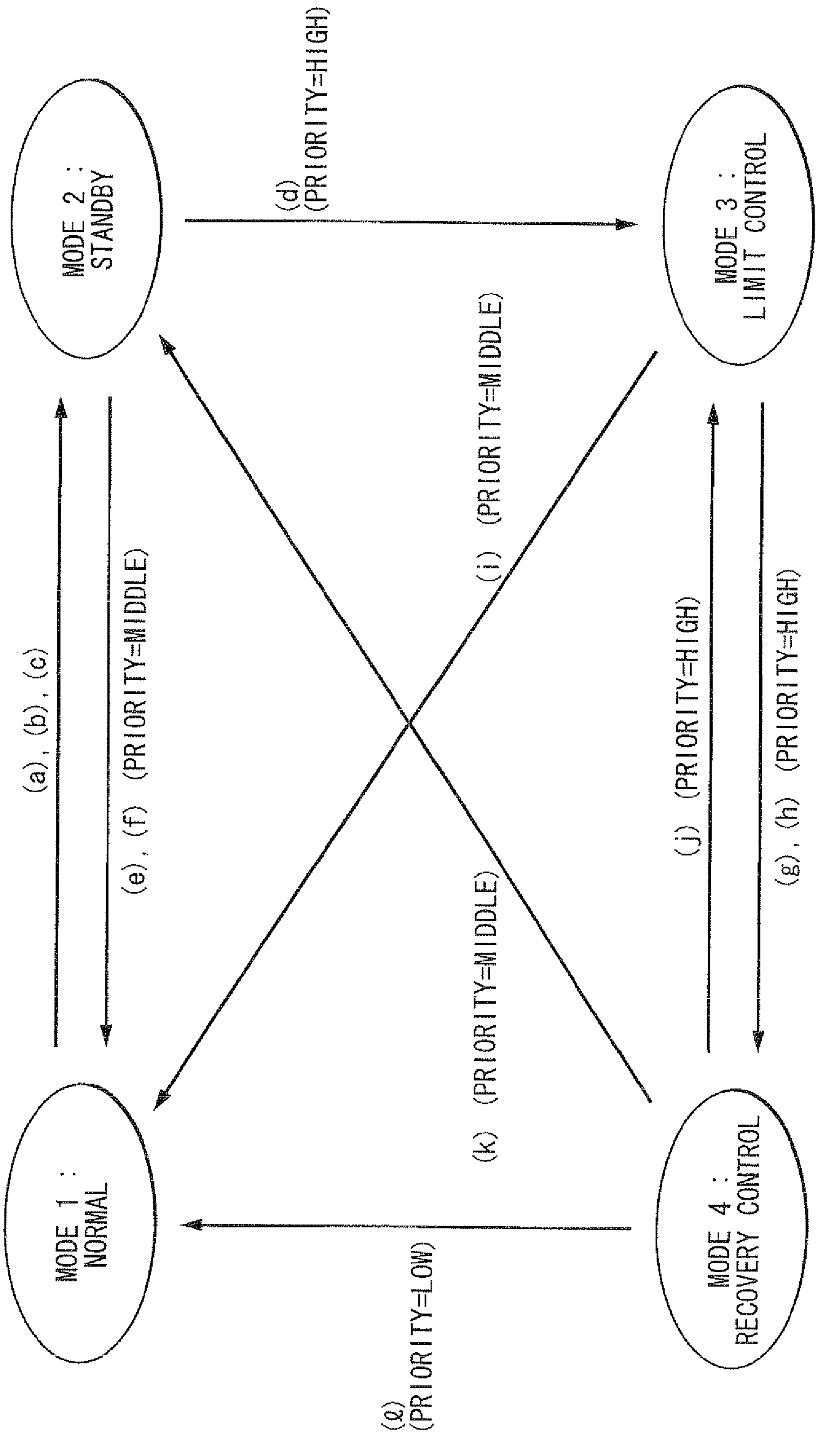
FIG. 2 is a diagram illustrating accelerator position output control according to the first embodiment.
Figure 3:
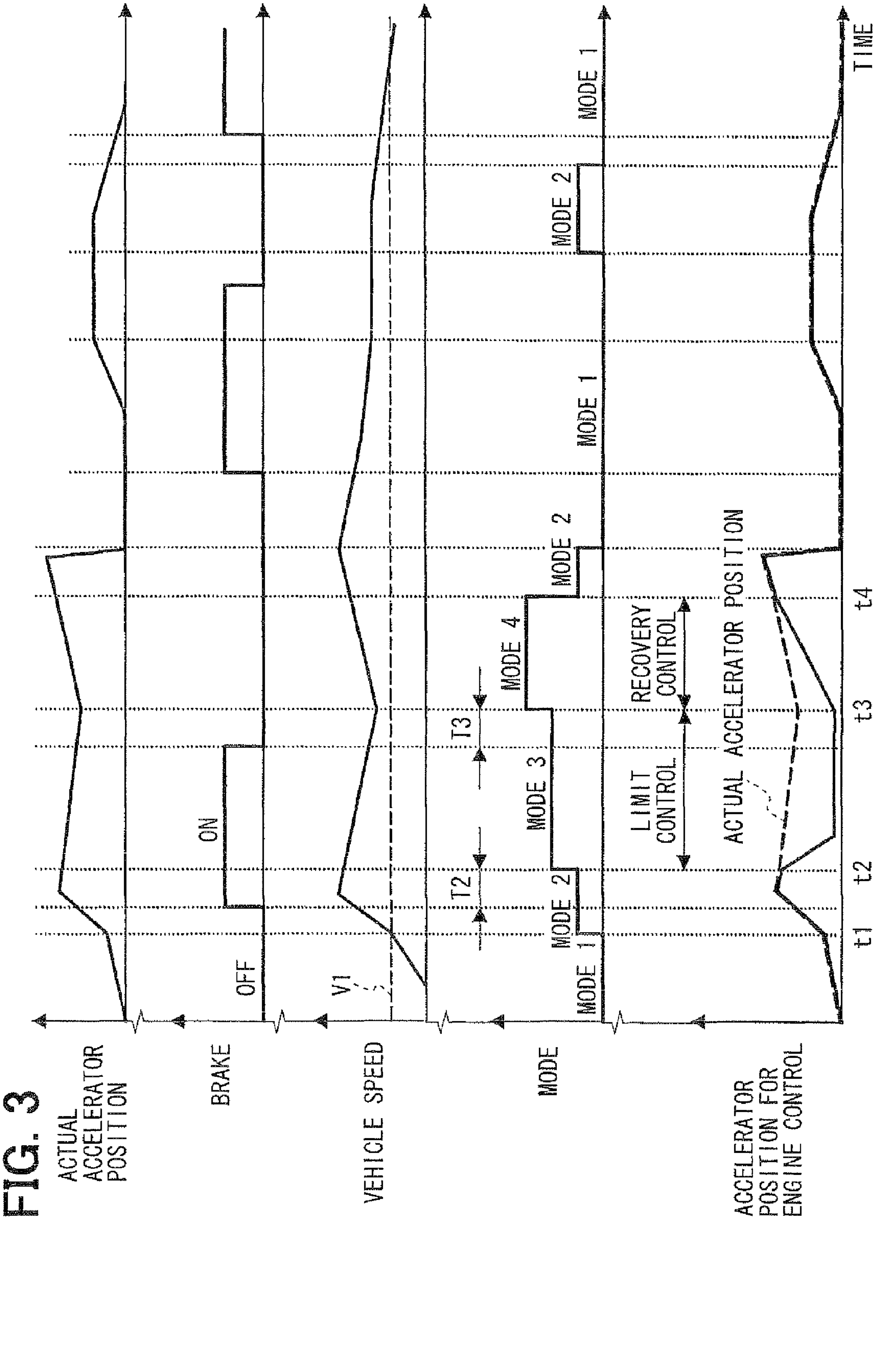
FIG. 3 is a time chart illustrating an implementation example of the accelerator position output control according to the first embodiment.

As shown in FIGS. 2 and 3, first, a mode is set at a normal mode (Mode 1) immediately after the ECU 30 is started.

(1) In the normal mode (Mode 1), the actual accelerator position (accelerator position sensed with accelerator sensor 31) is adopted as the accelerator position for the engine control as it is. The output of the engine 11 is controlled by using the accelerator position for the engine control (equal to actual accelerator position).

In the normal mode (Mode 1), it is determined whether following conditions (a) to (c) are satisfied.

(a) The vehicle speed is equal to or higher than a predetermined value V1.

(b) The actual accelerator position is larger than a predetermined value A1.

(c) The brake is in the off-state or a duration of the on-state of the brake is equal to or shorter than a predetermined time T1.

The predetermined value A1 of the above condition (b) may be a preset fixed value or may be set according to the vehicle speed.

When it is determined that all the conditions (a) to (c) are satisfied, i.e., when it is determined that the vehicle speed is equal to or higher than the predetermined value V1, it is determined that the actual accelerator position is larger than the predetermined value A1 (i.e., accelerator pedal 32 is pressed), and it is determined that the brake is in the off-state or the duration of the on-state of the brake is equal to or shorter than the predetermined time T1, a transition is made to a standby mode (Mode 2) at a timing t1 of the determination (refer to FIG. 3).

(2) In the standby mode (Mode 2), as in the normal mode (Mode 1), the actual accelerator position (accelerator position sensed with accelerator sensor 31) is adopted as the accelerator position for the engine control as it is. The output of the engine 11 is controlled by using the accelerator position for the engine control (equal to actual accelerator position).

In the standby mode (Mode 2), it is determined whether a following condition (d) is satisfied.

(d) The brake is in the on-state.

When it is determined that the condition (d) is satisfied, i.e., when it is determined that the brake is in the on-state (i.e., when brake pedal 34 is in pressed state), a transition is made to a limit control mode (Mode 3), and the accelerator position limit control is performed at the timing of the determination. Thus, at the timing when it is determined that the brake pedal 34 is pressed while the accelerator pedal 32 is pressed, the accelerator position limit control can be started quickly.

The above condition (d) may be replaced with a condition that the duration of the on-state of the brake is equal to or longer than a predetermined delay T2. The delay T2 is set according to the vehicle speed. When it is determined that the condition (d) is satisfied, i.e., when it is determined that the duration of the on-state of the brake is equal to or longer than the predetermined delay T2 (i.e., when predetermined delay T2 or longer time elapses after it is determined that brake pedal 34 is pressed), a transition is made to the limit control mode (Mode 3) at a timing t2 of the determination (refer to FIG. 3), and the accelerator position limit control is performed. Thus, a suitable delay T2 corresponding to the vehicle speed can be provided since it is determined that the brake pedal 34 is pressed when the accelerator pedal 32 is pressed until the accelerator position limit control is started.

When it is determined that the condition (d) is not satisfied, it is determined whether a following condition (e) or a condition (f) is satisfied. That is, priority of the conditions (e) and (f) is lower than the condition (d).

(e) The actual accelerator position is equal to or smaller than a predetermined value A2.

(f) The vehicle speed is lower than a predetermined value V2.

The predetermined value A2 of the condition (e) is set at a value smaller than the predetermined value A1 of the condition (b). The predetermined value V2 of the condition (f) is set at a value smaller than the predetermined value V1 of the condition (a).

When it is determined that the condition (e) or (f) is satisfied, i.e., when it is determined that the actual accelerator position is equal to or smaller than the predetermined value A2 or when it is determined that the vehicle speed is lower than the predetermined value V2, the mode returns to the normal mode (Mode 1) at the timing of the determination.

(3) In the limit control mode (Mode 3), the accelerator position limit control for reducing the accelerator position for the engine control to a limit value (e.g., accelerator position slightly larger than in idling) is performed. The output of the engine 11 is controlled by using the accelerator position for the engine control. The limit value is calculated with a map or the like in accordance with the vehicle speed as of the start of the accelerator position limit control (or present vehicle speed). The map of the limit value is set such that the limit value decreases as the vehicle speed as of the start of the accelerator position limit control (or present vehicle speed) decreases, for example.

Moreover, when the accelerator position limit control is performed, a subtraction amount corresponding to the vehicle speed as of the start of the accelerator position limit control is calculated with a map or the like. The map of the subtraction amount is set such that the subtraction amount decreases and change speed (reduction speed) of the accelerator position for the engine control slows down as the vehicle speed as of the start of the accelerator position limit control decreases. Then, the processing for obtaining the present accelerator position for the engine control by subtracting the subtraction amount from the previous accelerator position for the engine control (initial value of which is actual accelerator position) is repeated in a predetermined computation cycle until the accelerator position for the engine control reduces to the limit value. Thus, the accelerator position for the engine control is reduced to the limit value at the change speed (reduction speed) corresponding to the vehicle speed as of the start of the accelerator position limit control.

In the limit control mode (Mode 3), it is determined whether a following condition (g) or (h) is satisfied.

(g) An increase amount of the actual accelerator position per predetermined time is larger than a predetermined value ΔA3.

(h) The brake is in the off-state.

When it is determined that the condition (g) is satisfied, i.e., when it is determined that the increase amount of the actual accelerator position per predetermined time is equal to or larger than the predetermined value ΔA3 during the execution of the accelerator position limit control, it is determined that there is no need to suppress the engine output because the driver increased the accelerator position intentionally (i.e., pressed accelerator pedal 32 intentionally). Therefore, a transition is made to a recovery control mode (Mode 4) to perform accelerator position recovery control.

When it is determined that the condition (h) is satisfied, i.e., when it is determined that the brake is in the off-state during the execution of the accelerator position limit control (i.e., pressing of brake pedal 34 is cancelled), it is determined that there is no need to suppress the engine output because the driver cancelled the pressing of the brake pedal 34 intentionally at the timing. Therefore, a transition is made to the recovery control mode (Mode 4) to perform the accelerator position recovery control.

The above condition (h) may be replaced with a condition that a duration of the off-state of the brake is equal to or longer than a predetermined time T3. In this case, when it is determined that the condition (h) is satisfied, i.e., when it is determined that the duration of the off-state of the brake is equal to or longer than the predetermined time T3 (i.e., when predetermined time T3 or longer time elapses after it is determined that pressing of brake pedal 34 is cancelled), a transition may be made to the recovery control mode (Mode 4) at a timing t3 of the determination (refer to FIG. 3) to perform the accelerator position recovery control.

When neither the condition (g) nor the condition (h) is satisfied, it is determined whether a following condition (i) is satisfied. That is, priority of the following condition (i) is lower than priority of the conditions (g) and (h).

(i) The actual accelerator position is smaller than a predetermined value A3.

The predetermined value A3 of the condition (i) is set at a value smaller than the predetermined value A1 of the condition (b). When it is determined that the condition (i) is satisfied, i.e., when it is determined that the actual accelerator position is smaller than the predetermined value A3, a transition is made to the normal mode (Mode 1) at the timing of the determination.

(4) In the recovery control mode (Mode 4), the accelerator position recovery control for returning the accelerator position for the engine control to the actual accelerator position is performed, and the output of the engine 11 is controlled by using the accelerator position for the engine control.

When the accelerator position recovery control is performed, an addition amount corresponding to the vehicle speed as of the start of the accelerator position recovery control (or vehicle speed as of start of accelerator position limit control) is calculated with a map or the like. For example, the map of the addition amount is set such that the addition amount decreases and the change speed (increase speed) of the accelerator position for the engine control slows down as the vehicle speed as of the start of the accelerator position recovery control (or vehicle speed as of start of accelerator position limit control) decreases. Thus, the processing for obtaining the present accelerator position for the engine control by adding the addition amount to the previous accelerator position for the engine control in a predetermined computation cycle is repeated until the accelerator position for the engine control increases to the actual accelerator position. Thus, the accelerator position for the engine control is increased to the actual accelerator position at the change speed (increase speed) corresponding to the vehicle speed as of the start of the accelerator position recovery control (or vehicle speed as of start of accelerator position limit control). At that time, the change speed for increasing the accelerator position for the engine control to the actual accelerator position is limited by a predetermined upper limit value.

In the recovery control mode (Mode 4), it is determined whether a following condition (j) is satisfied.

(j) The brake is in the on-state.

When it is determined that the above condition (j) is satisfied, i.e., when it is determined that the brake is in the on-state during the execution of the accelerator position recovery control (i.e., when brake pedal 34 is in pressed state), the mode is returned to the limit control mode (Mode 3) at the timing of the determination, and the accelerator position limit control is performed.

When the above condition (j) is replaced with a condition that the duration of the on-state of the brake is equal to or longer than a predetermined time T4 and it is determined that the condition (j) is satisfied, that is, when it is determined that the duration of the on-state of the brake is equal to or longer than the predetermined time T4 (i.e., when predetermined time T4 or longer time elapses after it is determined that brake pedal 34 is pressed), the mode may be returned to the limit control mode (Mode 3) at the timing of the determination to perform the accelerator position limit control.

When it is determined that the condition (j) is not satisfied, it is determined whether a following condition (k) is satisfied. That is, priority of the following condition (k) is lower than priority of the condition (j).

(k) The accelerator position for the engine control is equal to or larger than the actual accelerator position.

When it is determined that the condition (k) is satisfied, that is, when it is determined that the accelerator position for the engine control is equal to or larger than the actual accelerator position, the accelerator position recovery control is ended at a timing t4 of the determination (refer to FIG. 3) and the mode is returned to the standby mode (Mode 2). Thus, the accelerator position for the engine control can be surely increased to the actual accelerator position.

When it is determined that the condition (k) is not satisfied, it is determined whether a following condition (I) is satisfied. That is, priority of the condition (l) is lower than priority of the condition (k).

(l) The actual accelerator position is smaller than the predetermined value A4.

The predetermined value A4 of the condition (l) is set at a value smaller than the predetermined value A1 of the condition (b). When it is determined that the condition (l) is satisfied, that is, when it is determined that the actual accelerator position is smaller than the predetermined value A4, the mode is returned to the normal mode (Mode 1) at a timing of the determination.

According to the above-described first embodiment, if it is determined that the brake pedal 34 is pressed when the accelerator pedal 32 is pressed, i.e., if it is determined that the brake pedal 34 is pressed at the same time when or after the accelerator pedal 32 is pressed, the accelerator position limit control for bringing the accelerator position for the engine control to the limit value corresponding to the vehicle speed is performed. Accordingly, the engine output can be suppressed in accordance with the vehicle speed. Therefore, the safety at the time when both of the accelerator pedal 32 and the brake pedal 34 are pressed can be secured.

If it is determined that the accelerator pedal 32 is pressed after the brake pedal 34 is pressed, it is determined that the driver has an intention to accelerate, and the accelerator position limit control is prohibited. Therefore, for example, when the accelerator pedal 32 is pressed in a state where the brake pedal 34 is pressed to prevent the vehicle from coming down when the vehicle is started on a slope, the accelerator position limit control is not performed. Thus, the suppression of the engine output can be avoided and the vehicle can be started. Accordingly, the driver's intention to accelerate can be respond to.

Even in the case where the driver presses both of the accelerator pedal 32 and the brake pedal 34 substantially at the same time, there is a possibility that a difference occurs in detection timing of the pressing (i.e., timing when output signal switches to state where pressing is detected) between an accelerator system and a brake system due to mechanical backlash, difference in response of the sensors or the like. Therefore, even when the driver presses the accelerator pedal 32 and the brake pedal 34 substantially at the same time, there is a possibility that it is erroneously determined that the accelerator pedal 32 is pressed after the brake pedal 34 is pressed, and the accelerator position limit control is not performed.

As a countermeasure, according to the first embodiment, it is determined that the brake pedal 34 is pressed at the timing when the predetermined delay elapses after the output signal of the brake switch 33 switches to the state where the pressing of the brake pedal 34 is detected. Therefore, when the driver presses the accelerator pedal 32 and the brake pedal 34 substantially at the same time, even if a slight difference occurs in the detection timing of the pressing (timing when output signal of sensor switches to state where pressing is detected) between the accelerator system and the brake system, the erroneous determination that the accelerator pedal 32 is pressed after the brake pedal 34 is pressed can be prevented. Accordingly, the accelerator position limit control can be surely performed.

Moreover, according to the first embodiment, when the accelerator position limit control is performed, the accelerator position for the engine control is reduced to the limit value at the change speed corresponding to the vehicle speed as of the start of the accelerator position limit control. Therefore, the accelerator position for the engine control can be reduced to the limit value at the suitable change speed. Accordingly, rapid change of the engine output can be avoided, and deterioration of drivability can be prevented.

According to the first embodiment, when it is determined that the pressing of the brake pedal 34 is cancelled during the execution of the accelerator position limit control, it is determined that there is no need to suppress the engine output because the driver intentionally cancelled the pressing of the brake pedal 34, i.e., the driver performed the off-operation of the brake pedal 34. Then, the accelerator position recovery control is performed. When the increase amount of the actual accelerator position per predetermined time is larger than a predetermined value during the execution of the accelerator position limit control, it is determined that there is no need to suppress the engine output because the driver intentionally increased the accelerator position, i.e., the driver intentionally pressed the accelerator pedal 32. Then, the accelerator position recovery control is performed. Therefore, a transition can be made to running (normal running) corresponding to the driver's intention to accelerate.

Moreover, according to the first embodiment, the accelerator position for the engine control is increased to the actual accelerator position at the change speed corresponding to the vehicle speed as of the start of the accelerator position recovery control (or vehicle speed as of start of accelerator position limit control) when the accelerator position recovery control is performed. Therefore, the accelerator position for the engine control can be increased to the actual accelerator position at the suitable change speed. Thus, the rapid change of the engine output can be avoided and the deterioration of the drivability can be prevented. Moreover, the change speed, at which the accelerator position for the engine control is increased to the actual accelerator position, is limited with the predetermined upper limit value. Therefore, the rapid change of the engine output can be surely prevented.

(Second Embodiment)

Next, a second embodiment of the present invention will be explained with reference to FIGS. 4 to 6. In the following description, differences from the first embodiment will be explained mainly.

In the second embodiment, the ECU 30 executes respective routines shown in FIGS. 4 to 6 (explained later) for the accelerator position output control. Thus, the accelerator position output control simplified as compared to the accelerator position output control of the first embodiment is performed. Next, processing contents of the respective routines shown in FIGS. 4 to 6 for the accelerator position output control will be explained.

(Accelerator Position Output Control Routine)

Figure 4:
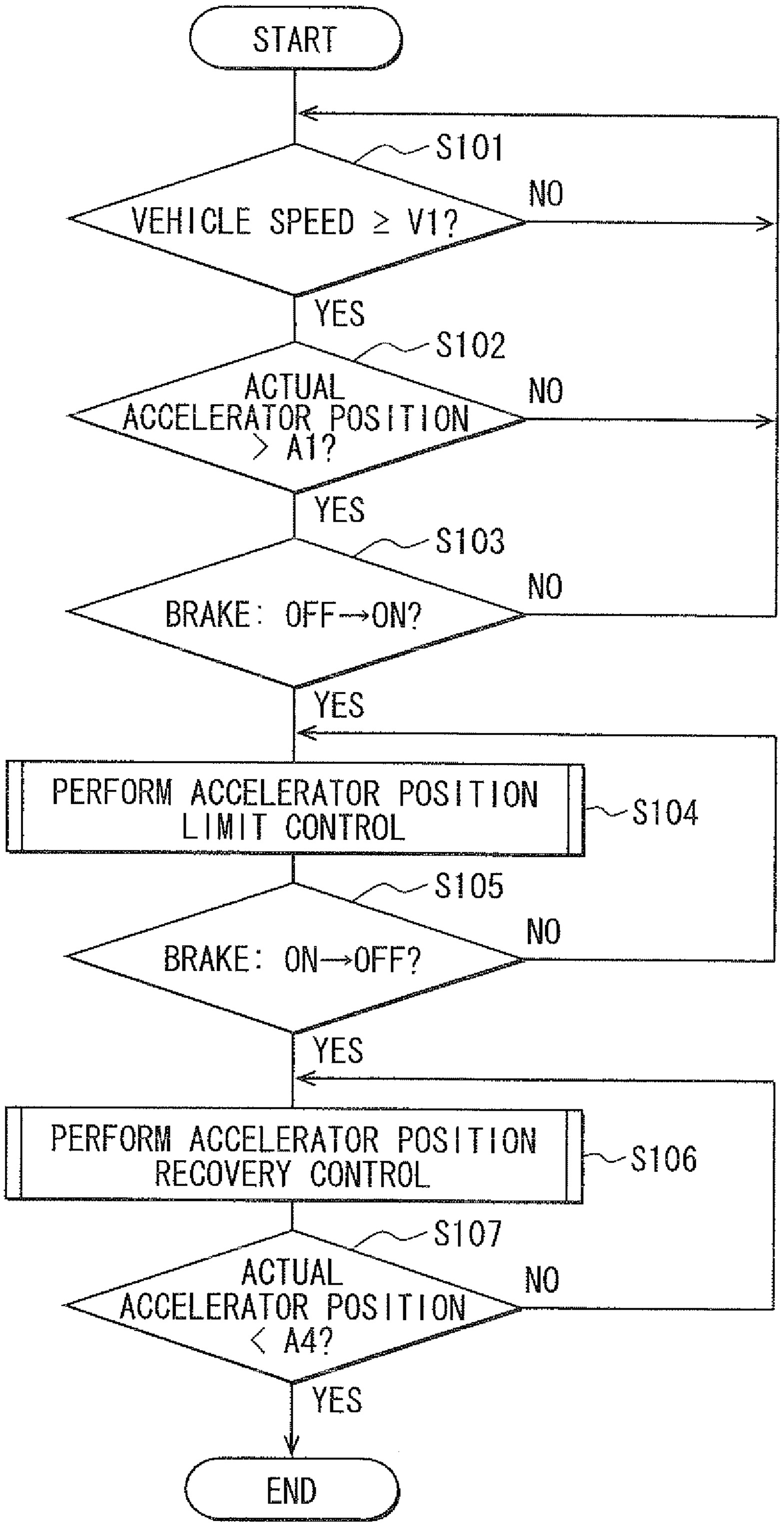
FIG. 4 is a flowchart showing a processing flow of an accelerator position output control routine according to a second embodiment of the present invention.

The accelerator position output control routine shown in FIG. 4 is executed repeatedly in a predetermined cycle while a power supply of the ECU 30 is ON. If the routine of FIG. 4 is started, first in S101, it is determined whether the vehicle speed is equal to or higher than a predetermined value V1.

If it is determined that the vehicle speed is equal to or higher than the predetermined value V1 in S101, the process proceeds to S102, in which it is determined whether the actual accelerator position is larger than a predetermined value A1. The predetermined value A1 may be a preset fixed value or may be set according to the vehicle speed.

If it is determined in S102 that the actual accelerator position is larger than the predetermined value A1 (i.e., accelerator pedal 32 is pressed), the process proceeds to S103. In S103, it is determined whether the brake has been changed from the off-state (state where pressing of brake pedal 34 is cancelled) into the on-state (state where brake pedal 34 is pressed).

If the brake pedal 34 is pressed before the accelerator pedal 32 is pressed, S103 is determined to be NO, and the process returns to S101. Thus, when the accelerator pedal 32 is pressed after the brake pedal 34 is pressed, the accelerator position limit control is prohibited.

If the brake pedal 34 is pressed when the accelerator pedal 32 is pressed, i.e., if the brake pedal 34 is pressed at the same time when or after the accelerator pedal 32 is pressed, S103 is determined to be YES, and the process proceeds to S104. In S104, the accelerator position limit control routine shown in FIG. 5 is executed. Thus, if the brake pedal 34 is pressed when the accelerator pedal 32 is pressed, i.e., if the brake pedal 34 is pressed at the same time when or after the accelerator pedal 32 is pressed, the accelerator position limit control for reducing the accelerator position for the engine control to the limit value is performed.

Figure 6:
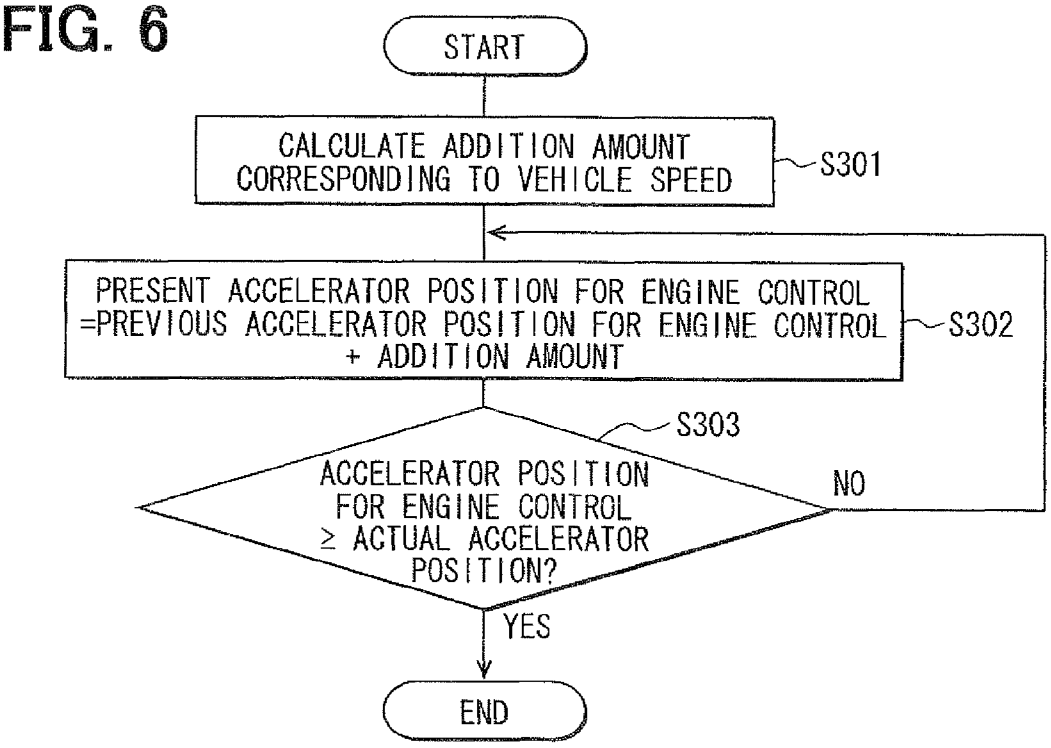
FIG. 6 is a flowchart showing a processing flow of an accelerator position recovery control routine according to the second embodiment.

Then, the process proceeds to S105, in which it is determined whether the brake has been changed from the on-state into the off-state during the execution of the accelerator position limit control, if it is determined in S105 that the brake is changed from the on-state into the off-state during the execution of the accelerator position limit control, the process proceeds to S106, in which the accelerator position recovery control routine shown in FIG. 6 is executed. In this way, if it is determined that the brake is changed from the on-state into the off-state during the execution of the accelerator position limit control, it is determined that there is no need to suppress the engine output because the driver intentionally cancelled the pressing of the brake pedal 34. Then, the accelerator position recovery control for returning the accelerator position for the engine control to the actual accelerator position is performed.

Then, the process proceeds to S107, in which it is determined whether the actual accelerator position is smaller than a predetermined value A4. The predetermined value A4 is set at a value smaller than the predetermined value A1 of S102. If it is determined in S107 that the actual accelerator position is smaller than the predetermined value A4, the accelerator position recovery control is ended.

(Accelerator Position Limit Control Routine)

Figure 5:
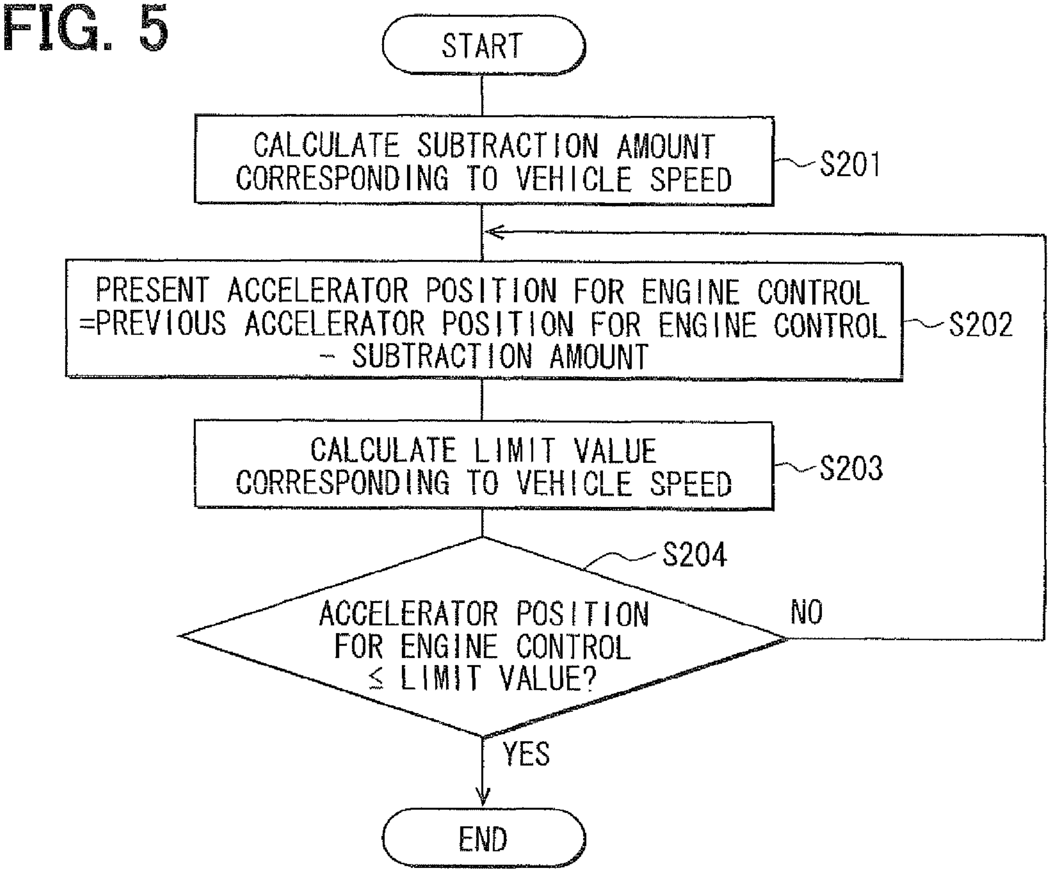
FIG. 5 is a flowchart showing a processing flow of an accelerator position limit control routine according to the second embodiment.

The accelerator position limit control routine shown in FIG. 5 is a subroutine executed in S104 of the accelerator position output control routine of FIG. 4. If the routine is started, first in S201, a subtraction amount corresponding to the vehicle speed as of the start of the accelerator position limit control is calculated with a map or the like. For example, the map of the subtraction amount is set such that the subtraction amount decreases and the change speed (reduction speed) of the accelerator position for the engine control decreases as the vehicle speed as of the start of the accelerator position limit control decreases.

Then, the process proceeds to S202, in which the present accelerator position for the engine control is obtained by subtracting the subtraction amount from the previous accelerator position for the engine control (initial value of which is actual accelerator position).

Present accelerator position for engine control=previous accelerator position for engine control−subtraction amount Then, the process proceeds to S203, in which the limit value corresponding to the vehicle speed as of the start of the accelerator position limit control (or present vehicle speed) is calculated with a map or the like. For example, the map of the limit value is set such that the limit value decreases as the vehicle speed as of the start of the accelerator position limit control (or present vehicle speed) decreases.

Then, the process proceeds to S204, in which it is determined whether the accelerator position for the engine control is equal to or smaller than the limit value. If it is determined that the accelerator position for the engine control is larger than the limit value, the process returns to S202. Thus, the processing for obtaining the present accelerator position for the engine control by subtracting the subtraction amount from the previous accelerator position for the engine control is repeated.

Thereafter, when it is determined in S204 that the accelerator position for the engine control is equal to or smaller than the limit value, the present routine is ended. With the above processing, the accelerator position limit control for reducing the accelerator position for the engine control to the limit value at the change speed (reduction speed) corresponding to the vehicle speed as of the start of the accelerator position limit control is performed.

(Accelerator Position Recovery Control Routine)

The accelerator position recovery control routine shown in FIG. 6 is a subroutine executed in S106 of the accelerator position output control routine shown in FIG. 4. If the routine is started, first in S301, an addition amount corresponding to the vehicle speed as of the start of the accelerator position recovery control (or vehicle speed as of start of accelerator position limit control) is calculated with a map or the like. For example, the map of the addition amount is set such that the addition amount decreases and the change speed (increase speed) of the accelerator position for the engine control decreases as the vehicle speed as of the start of the accelerator position recovery control (or vehicle speed as of start of accelerator position limit control) decreases.

Thereafter, the process proceeds to S302, in which the present accelerator position for the engine control is calculated by adding the addition amount to the previous accelerator position for the engine control in each computation cycle of the present routine.

Present accelerator position for engine control=previous accelerator position for engine control+addition amount Thereafter, the process proceeds to S303, in which it is determined whether the accelerator position for the engine control is equal to or larger than the actual accelerator position. If it is determined that the accelerator position for the engine control is smaller than the actual accelerator position, the process returns to S302. Thus, the processing for obtaining the present accelerator position for the engine control by adding the addition amount to the previous accelerator position for the engine control is repeated.

Thereafter, when it is determined in S303 that the accelerator position for the engine control is equal to or larger than the actual accelerator position, the present routine is ended. With the above processing, the accelerator position recovery control for increasing the accelerator position for the engine control to the actual accelerator position at the change speed (increase speed) corresponding to the vehicle speed as of the start of the accelerator position recovery control (or vehicle speed as of start of accelerator position limit control) is performed.

Also in the second embodiment as explained above, the accelerator position limit control is performed if the brake pedal 34 is pressed when the accelerator pedal 32 is pressed, i.e., if the brake pedal 34 is pressed at the same time when or after the accelerator pedal 32 is pressed. Accordingly, the safety at the time when both of the accelerator pedal 32 and the brake pedal 34 are pressed can be secured. If the accelerator pedal 32 is pressed after the brake pedal 34 is pressed, the accelerator position limit control is prohibited. Therefore, the driver's intention to accelerate can be responded to. Moreover, when the pressing of the brake pedal 34 is cancelled during the execution of the accelerator position limit control, the accelerator position recovery control is performed. Accordingly, a transition can be made to running (normal running) corresponding to the driver's intention to accelerate.

In the above-described first and second embodiments, the accelerator position limit control is aborted when it is determined that the pressing of the brake pedal 34 is cancelled during the execution of the accelerator position limit control. Alternatively, for example, the accelerator position limit control may be continued until the accelerator position for the engine control is reduced to the limit value after the start of the accelerator position limit control. Thus, the accelerator position for the engine control can be surely reduced to the limit value.

Moreover, the accelerator position limit control may be continued even if the vehicle speed becomes zero during the execution of the accelerator position limit control. With such the construction, even if the vehicle speed becomes zero during the execution of the accelerator position limit control, it is determined that there is a need to suppress the engine output, and the accelerator position limit control can be continued. Thus, the safety at the time when both of the accelerator pedal 32 and the brake pedal 34 are pressed can be improved more.

In the above-described first and second embodiments, when the accelerator position limit control is performed, the accelerator position for the engine control is reduced to the limit value at the change speed corresponding to the vehicle speed as of the start of the accelerator position limit control. Alternatively, for example, when it is desired to quickly reduce the accelerator position for the engine control to the limit value, the accelerator position for the engine control may be switched stepwise to the limit value.

In the above-described first and second embodiments, when the accelerator position recovery control is performed, the accelerator position for the engine control is increased to the actual accelerator position at the change speed corresponding to the vehicle speed as of the start of the accelerator position recovery control (or vehicle speed as of start of accelerator position limit control). Alternatively, for example, when it is desired to quickly increase the accelerator position for the engine control to the actual accelerator position, the accelerator position for the engine control may be switched stepwise to the actual accelerator position.

In the above-described first and second embodiments, the accelerator position limit control or the accelerator position recovery control is performed based on the on-operation or the off-operation of the brake pedal of the regular brake device (brake device for decelerating or stopping vehicle during operation of vehicle). Alternatively, for example, the accelerator position limit control or the accelerator position recovery control may be performed based on an on-operation or an off-operation of a brake pedal of a parking brake device (brake device for keeping vehicle stationary while vehicle is parked).

The present invention is not limited to the vehicle having the brake pedal as the brake operation section. Alternatively, for example, the present invention may be applied to a vehicle having a brake lever or the like as the brake operation section. Moreover, the present invention is not limited to the vehicle having the accelerator pedal as the accelerator operation section. Alternatively, the present invention may be applied to a vehicle having an accelerator lever or the like as the accelerator operation section.

The present invention may be applied to a vehicle having a brake sensor for sensing an operation amount of the brake operation section instead of the brake switch that senses the operation of the brake operation section.

The present invention is not limited to the inlet port injection engine shown in FIG. 1. Alternatively, the present invention can be also applied to a direct-injection engine or a dual-injection engine that has both of an injector for inlet port injection and an injector for direct injection and can be implemented, While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An engine controller of a vehicle comprising:

an accelerator sensor for sensing an operation amount of an accelerator operation section as an accelerator position;

a brake sensor for sensing an operation of a brake operation section; and an engine controlling means for controlling an engine based on the accelerator position sensed with the accelerator sensor, wherein the engine controlling means determines an on-operation of the accelerator operation section based on an output signal of the accelerator sensor and determines an on-operation of the brake operation section based on an output signal of the brake sensor;

when it is determined that the on-operation of the brake operation section is performed during the on-operation of the accelerator operation section, the engine controlling means performs accelerator position limit control for bringing an accelerator position for engine control to a limit value corresponding to vehicle speed; and the engine controlling means reduces the accelerator position for the engine control to the limit value at change speed corresponding to vehicle speed as of start of the accelerator position limit control when the engine controlling means performs the accelerator position limit control, wherein the change speed is set such that the change speed decreases with decreases in the vehicle speed as of start of the accelerator position limit control.

2. The engine controller as in claim 1, wherein the engine controlling means starts the accelerator position limit control at a timing when it is determined that the on-operation of the brake operation section is performed during the on-operation of the accelerator operation section.

3. The engine controller as in claim 1, wherein the engine controlling means starts the accelerator position limit control at a timing when a delay corresponding to vehicle speed elapses after it is determined that the on-operation of the brake operation section is performed during the on-operation of the accelerator operation section.

4. The engine controller as in claim 1, wherein the engine controlling means continues the accelerator position limit control until the accelerator position for the engine control is reduced to the limit value after the accelerator position limit control is started.

5. The engine controller as in claim 1, wherein the engine controlling means aborts the accelerator position limit control when it is determined that the on-operation of the brake operation section is cancelled during the execution of the accelerator position limit control.

6. The engine controller as in claim 1, wherein the engine controlling means continues the accelerator position limit control even if the vehicle speed becomes zero during the execution of the accelerator position limit control.

7. The engine controller as in claim 1, wherein the engine controlling means prohibits the accelerator position limit control if it is determined that the on-operation of the accelerator operation section is performed after the on-operation of the brake operation section is performed.

8. The engine controller as in claim 1, wherein the engine controlling means determines that the on-operation of the brake operation section is performed when a predetermined delay elapses after the output signal of the brake sensor switches to a state where the on-operation of the brake operation section is detected.

9. The engine controller as in claim 1, wherein the engine controlling means performs accelerator position recovery control for returning the accelerator position for the engine control to an actual accelerator position sensed with the accelerator sensor when it is determined that the on-operation of the brake operation section is cancelled during the execution of the accelerator position limit control.

10. The engine controller as in claim 9, wherein the engine controlling means ends the accelerator position recovery control when the accelerator position for the engine control becomes equal to or larger than the actual accelerator position after the start of the accelerator position recovery control.

11. The engine controller as in claim 9, wherein the engine controlling means increases the accelerator position for the engine control to the actual accelerator position at change speed corresponding to vehicle speed as of the start of the accelerator position recovery control or as of the start of the accelerator position limit control when the engine controlling means performs the accelerator position recovery control.

12. The engine controller as in claim 11, wherein the engine controlling means limits the change speed, at which the accelerator position for the engine control is increased to the actual accelerator position, with a predetermined upper limit value when the engine controlling means performs the accelerator position recovery control.

13. The engine controller as in claim 1, wherein the engine controlling means performs accelerator position recovery control for returning the accelerator position for the engine control to an actual accelerator position sensed with the accelerator sensor when an increase amount of the actual accelerator position per predetermined time is larger than a predetermined value during the execution of the accelerator position limit control.

14. The engine controller as in claim 13, wherein the engine controlling means ends the accelerator position recovery control when the accelerator position for the engine control becomes equal to or larger than the actual accelerator position after the start of the accelerator position recovery control.

15. The engine controller as in claim 13, wherein the engine controlling means increases the accelerator position for the engine control to the actual accelerator position at change speed corresponding to vehicle speed as of the start of the accelerator position recovery control or as of the start of the accelerator position limit control when the engine controlling means performs the accelerator position recovery control.

16. The engine controller as in claim 15, wherein the engine controlling means limits the change speed, at which the accelerator position for the engine control is increased to the actual accelerator position, with a predetermined upper limit value when the engine controlling means performs the accelerator position recovery control.

17. The engine controller as in claim 1, wherein the brake operation section is a brake operation section of a regular brake device or a parking brake device.

18. The engine controller as in claim 1, wherein the limit value is set such that the limit value decreases with decrease in the vehicle speed.

19. An engine controller of a vehicle comprising:

a computer system, comprising a computer processor, configured to at least:

receive an input from an accelerator sensor, the input from the accelerator sensor corresponding to an operation amount of an accelerator operation section as an accelerator position;

receive an input from a brake sensor, the input from the brake sensor corresponding to an operation of a brake operation section; and control an engine based on the received input from the accelerator sensor;

determine a pressing of the accelerator operation section based on the received input from the accelerator sensor and determine a pressing of the brake operation section based on the received input from the brake sensor;

perform accelerator position limit control for bringing an accelerator position for engine control to a limit value corresponding to vehicle speed based on a determination that the pressing of the brake operation section is performed at the same time as the pressing of the accelerator operation section; and reduce the accelerator position for the engine control to the limit value at a change speed corresponding to vehicle speed as of a start of the accelerator position limit control, wherein the change speed is set such that the change speed decreases with decreases in the vehicle speed as of start of the accelerator position limit control.

20. The engine controller as in claim 19, wherein the limit value is set such that the limit value decreases with decrease in the vehicle speed.

* * * * *